Aug. 19, 1958

L. A. MOREHEAD 2,847,761

REENTRANT TEMPLET DEVICE

Filed Feb. 27, 1953

INVENTOR.
LAUREL A. MOREHEAD

BY

ATTORNEY

United States Patent Office 2,847,761
Patented Aug. 19, 1958

2,847,761

REENTRANT TEMPLET DEVICE

Laurel A. Morehead, St. Paul, Minn., assignor to National Cylinder Gas Company, Chicago, Ill., a corporation of Delaware Application February 27, 1953, Serial No. 339,386

11 Claims. (Cl. 33—23)

This invention relates in general to templets for guiding flame cutting torches in machine shape cutting operations, and more particularly to a movable templet device for guiding the cutting of elongated and narrow slot like reentrants cuts.

Heretofore in the machine flame shape cutting art wherein strip templets and wheeled tractive templet tracers are customarily employed, reentrant cuts of small curvature or of elongate and narrow nature have been limited to those having radii and widths not less than twice the radius and often twice the diameter of the pivoting tractive wheel of the templet tracer, depending upon the particular design of the tracer. This is due to the fact that economics have favored electrically driven wheeled traction templet tracers over more versatile but excessively more complex and expensive light beam and electronic templet tracing means.

The type of templet tracer in common use in this art today and to which the instant invention is particularly adaptable, is a swivel device having a pair of closely spaced wheels for straddling strip or rail like templet patterns. In these devices one or both wheels may be knurled or grooved for tractive engagement with a side or edge of the templet strip, and usually only one wheel is driven, the other being merely an idler and provided to maintain tension for the driving wheel so that the latter may maintain uniform tractive engagement with the templet. As long as the turns, bends or corners in the templet pattern are in the direction of the side on which the driving wheel of the tracer is located, little difficulty is encountered in obtaining relatively small radius turns, regardless of whether the cutting machine is designed so that the torch axis or axes in the case of plural torches, follow paths corresponding to the path of the templet tracer driving wheel axis or the longitudinal center of the templet strip or rail. This is by virtue of the fact that the smallest radius curves or the sharpest angles must at the corresponding templet portion have a radius of curvature at least equal to the radius of the pivoting tracer wheel, and which in the case referred to, is the driving wheel.

In the case of a reentrant cut on the other hand, that is a cut where the templet curvature is in the direction of the idler tracer wheel, the situation immediately becomes somewhat more perplexing. Here, it is the idler wheel which forms the pivot and the driving wheel must drive on around the outside of the reentrant curvature or the greater radius. Even if the torch axis is following the templet center line, the corresponding curvature of the cut must be at least the diameter of the pivoting idler wheel plus half the thickness of templet strip, and if the torch axis is designed to follow the driving wheel axis which is not uncommon, the curvature of the reentrant cut will be twice the diameter of the driving wheel (assuming idler wheel diameter equal to driving wheel diameter) plus the thickness of the templet.

In many templet traced shape cutting operations, in addition to smooth curves of small radius, it is often desirable to obtain an elongate slot of small width. Heretofore, it has not been possible with templet means to obtain such narrow slots where the width of the slot is less than the diameter of the appropriate tracer wheel. This condition becomes even more aggravated where the narrow slot is reentrant, that is following a templet path in the direction of the idler tracer wheel rather than that of the driving wheel, and it is particularly so in the case of equipment which for other advantageous reasons is designed to have the torch axis correspond to the axis of the driving wheel of the templet tracer.

It is accordingly the principal object of this invention to provide templet means operable with either of the above referred to types of templet tracers, which will permit the reentrant cutting of curves or elongate narrow cuts, the radius of curvature or the width of which may be considerably less than the diameter of the pivoting or idler templet tracer wheel.

A feature of the instant invention resides in the provision of a pivotal and partially overriding templet or templet insert for accomplishing a cut of the nature referred to in the object set out above.

Additional features and advantages of the instant invention will become readily apparent as the following description proceeds, taken in conjunction with the accompanying drawings wherein:

Fg. 1 is a perspecive view illustrating a standard flame shape cutting machine of the Chouinard type and embodying the novel templet device of this invention.

Figure 3:
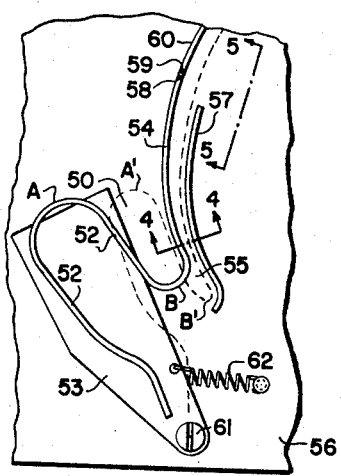
Fig. 3 is a view similar to Fig. 2 but wherein the movable templet section is in its moved or operated position.
Figure 4:
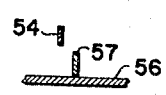
Figure 5:
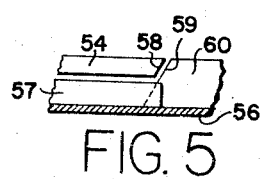

Figs. 4 and 5 are sectional views on lines 4—4 and 5—5 respectively of Fig. 3.

Figure 6:
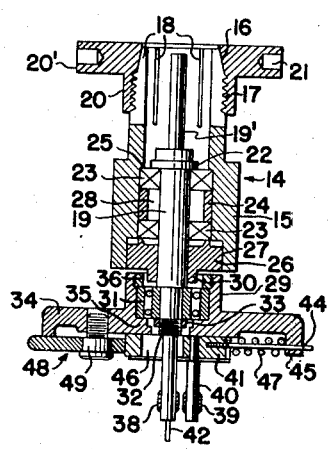

Fig. 6 is a central longitudinal sectional view of a standard swivel templet tracer device simply modified for use with the instant inventive device.

Figure 1:
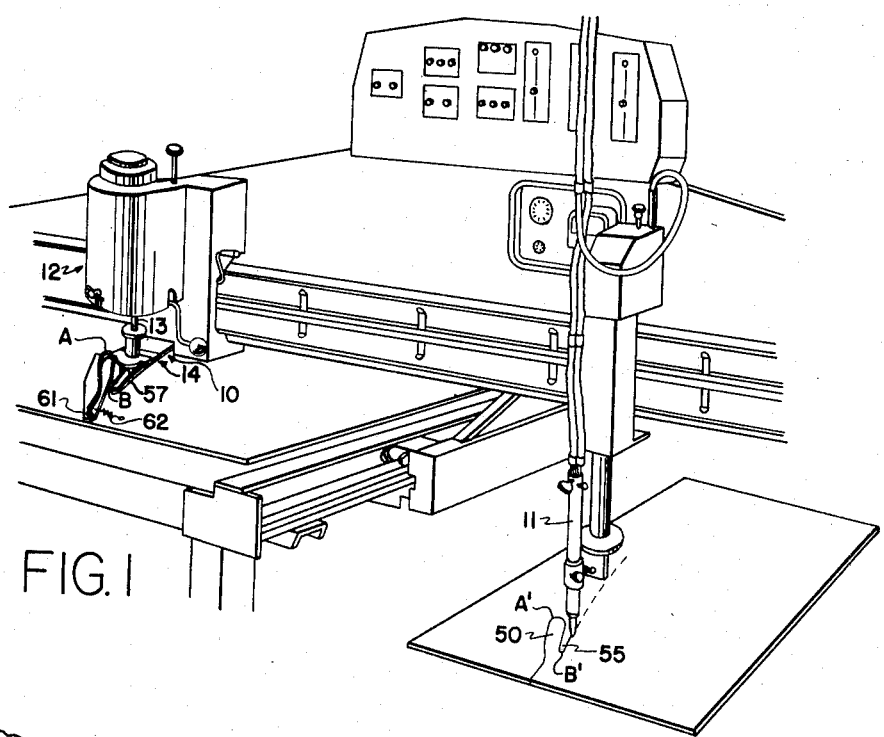

The general apparatus guided in a shape cutting operation by a templet 10 as shown in Fig. 1 will not be described in detail herein as it is now well known in the art and comprises in substance a flame shape cutting machine of the type shown and described in Alfred F. Chouinard Patent No. 2,336,596 to which reference may be had. However, in passing it might be noted that although for convenience of illustration, in Fig. 1 only one cutting torch 11 has been shown, in templet guided flame shape cutting, it is usual that three or four such cutting torches are simultaneously guided to cut a corresponding plurality of shapes from a single templet on the table portion of the machine as seen in the left hand portion of Fig. 1 and associated templet tracer 14 driven by a drive unit 12 of the cutting machine.

A typical non-differentially driven swivel templet tracer for connection to the drive unit 12 is found in Fig. 1 indicated generally at 14 and is shown in greater detail in Fig. 6. The tracer device 14 as illustrated in Fig. 6 comprises a sleeve 15 which at its upper end is tapered at 16, threaded at 17 and slotted at 18 so that in cooperation with a correspondingly internally tapered and threaded locking nut 20, a simple chuck arrangement is provided for securing the sleeve 15 to a spindle sleeve 13 from which the driving spindle of the drive unit 12 rotatably extends and which in turn is connected to the longitudinally and transversely movable cutting machine carriage as disclosed in the above referred to patent.

The driving spindle (not shown) may be internally and longitudinally broached adjacent its depending end, that is the end rotatably extending from within sleeve 13, to snugly fit over the upper end $19^1$ of the swivel tracer central shaft 19 which upper end is formed with two oppositely arranged flat sides so that a non-slip connection is obtained between the driving motor spindle (not shown) and the central shaft 19 of the tracer 14 and held in such position by the chuck arrangement 16—18 secured to sleeve 13. To facilitate hand tightening, lip 20¹ of the chuck nut 20 may be externally knurled and additionally, a plurality of short bores 21 may be provided for the insertion thereinto of pins or a spanner wrench in the event that greater tightening leverage is desired.

The central tracer shaft 19 is rotatably journalled within the sleeve 15 by means of an integral shoulder 22 bearing on one of a pair of bearings 23, preferably of the ball type, spaced apart by a bushing 24. The upper bearing of this pair abuts a shoulder 25 in sleeve 15 and a closure piece 26 is positioned as by a press fit into an end counterbore 27 in sleeve 15 so as to bear against the other or lower bearing 23 of said pair. The space 28 between the pair of bearings 23, bushing 24 and the central shaft 19 may be utilized to hold an internal lubricant supply.

The central tracer shaft 19 extends slightly below an outer collar like end 30 of closure 26 where it is reduced in diameter to accept a race enclosed bearing 31, again preferably of the ball type. Immediately below the bearing receiving reduced portion, the shaft 19 is again slightly reduced in diameter and a small portion 32 is threaded, preferably left hand, to receive a nut 33 correspondingly threaded to bear against the race of bearing 31 and hold it fixed to shaft 19.

An integral collar 29 of a swivel plate 34 surrounds the bearing 31. The swivel plate 34 has an enlarged central bore communicating with collar portion 29, the dimension of the bore providing an annular supporting shoulder below bearing 31. The swivel plate is secured to the race of bearing 31 by a gland like threaded lock ring 36 received in internal threads in collar 29 above the bearing 31. The swivel plate 34 is accordingly rotatable relative to the sleeve portion 15.

At the end of central shaft 19 which extends through and below swivel plate 34, there is keyed or splined thereto a knurled or otherwise externally abraded or grooved driving wheel 38 adapted to tractively engage a side of the upstanding templet strips or rails 10.

Below driving wheel 38, the central driving shaft 19 to which it is secured is provided with a projection or extension 42 of short length, slightly less in length than the height of the fixed templet strips or rails on which the tracer is designed to operate and the purpose of which will be described later.

Offset from the driving wheel 38 and adjacent thereto is an idler wheel 39 which may or may not be tractive. The idler wheel 39 is rotatably mounted and maintained on the end of a stub shaft 40 offset from but parallel to shaft 19. The other or upper end of the stub shaft 40 is fixed or keyed into a tension plate 41 which is slidably secured against the underside of the swivel plate 34 by means of pins 44 threaded laterally thereinto and slidably extending through a depending ear 45 of the swivel plate 34. The tension plate 41 is provided with a central slot 46 to accommodate the lower extension of central driving shaft 19 and is laterally acted upon by compression springs 47 surrounding pins 44 and positioned between tension plate 41 and the ear 45 of the swivel plate 34. In this manner the idler wheel 39 is at all times urged toward the driving wheel 38 under the tension of the compression springs 47 so that when the templet strip 10 is between wheels 38 and 39, sufficient tension is maintained to provide the driving wheel 38 with adequate traction to enable it to drive the tracer 14 and connected apparatus without slippage.

A cam and lever arrangement 48 pivotally secured to swivel plate 34 by pivot pin 49 is provided for urging tension plate 41 against the tension of springs 47 so that wheels 38 and 39 may be separated when the device is initially lowered into engagement with the templet 10, or when it is to be released.

Templets for guiding cutting torches through the medium of a swivel templet tracer such as has just been described and generally constructed by affixing to any suitable base or plate metallic strips or rails shaped to conform to the shape desired to be cut by the torches. A typical templet of this kind will utilize thin gauge steel or other metallic strips in the neighborhood of ¾ to 1 inch in height and 1/16 to 1/8 inch or thereabouts in thickness, and are usually either tackwelded to a thin gauge sheet steel plate base or otherwise affixed with brackets to a wooden or similar base.

Figure 2:
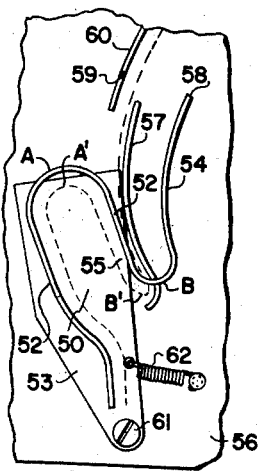
Fig. 2 is a top plan view of a portion of a templet with the movable section forming this invention therein and shown in its normal or rest position.

Referring now particularly to Figs. 2 and 3 and assuming that the type of templet tracer described with relation to Fig. 6 is used wherein the torch axis corresponds to the tracer drive axis, let it be further assumed that a shape such as shown in the phantom lines in those figures is desired to be cut in a workpiece, such as the plate shown beneath the torch 11 in Fig. 1. Ordinarily it would present no problem to make a templet to cut the handle like portion 50. The driving wheel on the inside of the templet and the turn tracer is placed on the inside of the templet and the turn A¹ would then be in the direction toward the driving wheel axis and the long narrow handle like portion 50 could easily be accomplished with a fixed templet portion not unlike portion 52. However, assume that immediately adjacent handle 50 it is now desired to cut a long narrow slot 55, less in width than the tracer idler wheel. With a fixed templet this is impossible as the curve B¹ of the slot is now reentrant, relative to the curve A¹ just completed and even if the curvature of the templet were great enough to accept the idler wheel, the width of the corresponding shape cut would be twice the diameter of the wheel plus the thickness of the templet. Even if the apparatus were designed such that the torch axis corresponded to the center of the templet rail, the width of the slot would still of necessity be greater than the width of the pivoting tracer wheel plus the thickness of the templet.

In the instant invention, as illustrated in Figs. 2 and 3 particularly, this desired cut is accomplished by mounting a portion of the templet pattern on a pivotal base 53. The pivotal part of the templet constitutes a portion 52 having a curved part affixed to the pivotal base 53 for accomplishing the handle like shape 50 and continuing therefrom extending beyond base 53, and a portion 54 having a reentrant curved part B for guiding the reentrant cutting of the long narrow portion 55 and its curve B¹. The curved part B of the templet portion 54 it will be noted, although having a smaller radius of curvature than curve A of portion 52, nonetheless has sufficient curvature to easily accept the pivoting idler tracer wheel. From about the middle of curve B, the templet portion 54 is undercut so that it can freely override a guide or push rail 57 fixed to the main templet base 56. The end 58 of the overriding templet portion 54 is preferably bevelled to mate with a complementary bevel 59 in the adjoining fixed templet section 60 which is fixed to the main base 56.

The small movable base portion 53 to which the movable templet portions are secured is pivotally mounted to the main templet base 56 by a pin or screw 61. A spring 62 is fixed between the movable base portion 53 and base 56 to bias the movable portion normally in the position shown in Fig. 2; that is with overriding portion 54 in overlapping relation to the guide rail 57.

The operation of the device is as follows: The templet tracer such as shown in Fig. 6 is mounted on the movable portion of the templet near the pivot 61 with the driving wheel on the inside of portion 52. The tracer advances completely around curve A and as it approaches curve B, the handle like portion 50 is shape cut in normal fashion just as if with a stationary templet. As soon as the tracer has advanced to the beginning of the reentrant curve B of portion 54 however, the depending projection 42 below the driving wheel 38 abuts the fixed guide rail 57. This temporarily arrests motion of the tracer 14 relative to the main base 56 but causes the curved part B of the templet portion 54 to move relative to the tracer, the movable templet portion pivoting counter clockwise about pivot 61 due to the continued tractive turning of the driving wheel 38. When the reentrant curve B of templet portion 54 has thus traversed the tracer, the movable portion of the templet may be pivoted somewhat beyond the position illustrated in Fig. 3. The driving wheel 38 of the templet tracer now resumes its advance relative to the overriding section of the templet portion 54 toward end 58. The guide rail 57 is arranged so that the movable templet portion returns somewhat clockwise about the pivot 61 during the travel of the tracer along the undercut portion 54 of the movable templet, the projection 42 continuing to abut the guide rail 57 under bias of spring 62 until the tracer leaves the movable templet portion to continue its advancement on fixed portion 60. It should be here noted that the guide rail 57 is shaped to substantially correspond to the shape of the overriding templet portion and is so positioned adjacent thereto that the end 58 of the movable section 54 will be aligned with the end 59 of the fixed section 60 as the tracer travels from one on to the other (see Fig. 3). When the tracer leaves the movable portion of the templet, the latter returns to its normal position (Fig. 2) under the tension of the spring 62.

The remainder of the templet may be entirely of the fixed type or it may be provided with one or more movable portions such as just described for accomplishing additional reentrant curves and/or slots if such shapes are desired.

The invention herein described resides in part in the proportioning and arrangement of its various parts, and it is apparent that modifications and such variations as will suggest themselves to those skilled in the art and coming within the spirit of this invention are intended to be included within its scope, as best defined in the appended claims.

I claim:

1. Method of making a reentrant cut with a machine operated flame cutting torch responding to a power driven tracer guided by a templet mounted on a fixed base, said cut being of less width than the diameter of the pivoting wheel of the tracer, comprising the steps of advancing the tracer on a templet section pivotally movable relative to said base without moving said section relative to the base, at a preselected position temporarily arresting movement of the tracer relative to the base while driving the movable templet section relative to the base through an arc about its pivot spaced from the axis of the pivoting wheel of the tracer until said section has assumed a predetermined different position, and completing the reentrant cut by again advancing the tracer on the movable templet section without moving said section relative to the base.

2. Method of making a reentrant cut with a machine operated flame cutting torch responding to a power driven tracer guided by a templet mounted on a fixed base, said cut being of less width than the diameter of the pivoting wheel of the tracer, comprising the steps of advancing the tracer on a templet section pivotally movable relative to said base without moving said section relative to the base during an entrant portion of the cut, at a preselected position temporarily arresting movement of the tracer relative to the base while driving the movable templet section relative to the base through an arc about its pivot spaced from the axis of the pivoting wheel of the tracer until said section has assumed a predetermined different position to achieve an abrupt reentrant portion of the cut, and completing the reentrant cut by again advancing the tracer on the movable templet section without moving said section relative to the base.

3. Method of making an abrupt reentrant turn with a machine operated flame cutting torch responding to a power driven tracer guided by a templet mounted on a fixed base, comprising the steps of advancing the tracer on a templet section pivotally movable relative to said base without moving said section relative to the base, at a preselected position temporarily arresting movement of the tracer relative to the base while driving a curved portion of the movable templet section relative to the base through an arc about its pivot spaced from the axis of the pivoting wheel of the tracer until the templet section has assumed a predetermined different position, and then again advancing the tracer on the pivotally movable templet section without moving said section relative to the base.

4. In combination, a templet device for use with a machine operated flame cutting torch responding to a power driven tracer provided with a drive wheel adapted for engagement with the templet, comprising a pivotally movable section of the templet mounted on a fixed base, and means for temporarily arresting movement of the tracer relative to the base while the movable templet section is driven relative to the base through an arc about its pivot spaced from the drive wheel of the tracer to effect an abrupt reentrant cut, said movable section remaining stationary with respect to the base during non-reentrant cutting therewith.

5. Templet device as claimed in claim 4, said means comprising a fixed rail for engagement with the tracer.

6. Templet device as claimed in claim 5, which said section includes spring means biasing said movable section in its non-reentrant cutting position.

7. In combination, a templet device for guiding a machine operated flame cutting torch responding to a power driven tracer provided with a drive wheel in tractive engagement with the templet to cut narrow slot-like reentrant shapes, portions at least of which are of less width than the diameter of the pivoting wheel of the tracer, comprising a pivotally movable templet section mounted on a fixed base, and means operative after a portion of said movable templet section corresponding to a portion of the slot has been traversed without movement of said section for temporarily arresting movement of the tracer relative to the base while the movable templet section is driven relative to the base through an arc about its pivot spaced from the drive wheel of the tracer into position to guide the cutting of the remainder of said reentrant cut.

8. In combination, a templet device for guiding a machine operated flame cutting torch responding to a power driven tracer provided with a drive wheel in tractive engagement with the templet to cut narrow slot-like reentrant shapes, portions at least of which are of less width than the diameter of the pivoting wheel of the tracer, comprising a pivotally movable templet section mounted on a fixed base, and means including a fixed guide rail for engagement with said tracer operative after a portion of said movable templet section corresponding to a portion of the slot has been traversed without movement of said section for temporarily arresting movement of the tracer relative to the base while the movable templet section is driven relative to the base through an arc about its pivot spaced from the drive wheel of the tracer into position to guide the cutting of the remainder of said reentrant slot.

9. In combination, a templet device for guiding a machine operated flame cutting torch responding to a power driven tracer provided with a drive wheel in tractive engagement with the templet to cut narrow slot-like reentrant shapes, portions at least of which are of less width than the diameter of the pivoting wheel of the tracer, comprising a pivotally movable templet section